(12) United States Patent
Muenzer et al.

(10) Patent No.: US 7,352,569 B2
(45) Date of Patent: Apr. 1, 2008

(54) METHOD AND APPARATUS FOR SECURING A MODULAR COMPONENT IN A CHASSIS

(75) Inventors: Christopher Muenzer, Gahanna, OH (US); David J. Hernandez, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/671,187

(22) Filed: Feb. 5, 2007

(65) Prior Publication Data

US 2007/0127204 A1 Jun. 7, 2007

Related U.S. Application Data

(63) Continuation of application No. 11/065,725, filed on Feb. 24, 2005, now Pat. No. 7,190,574.

(51) Int. Cl.
G06F 1/16 (2006.01)
(52) U.S. Cl. ..................... 361/685; 312/223.2
(58) Field of Classification Search ................ 361/685, 361/724–727
See application file for complete search history.

(56) References Cited

U.S. PATENT DOCUMENTS

| 5,483,420 | A | | 1/1996 | Schiavini |
| 5,748,442 | A | | 5/1998 | Toor |
| 6,064,568 | A | | 5/2000 | Schmitt |
| 6,122,173 | A | * | 9/2000 | Felcman et al. ............ 361/726 |
| 6,288,902 | B1 | | 9/2001 | Kim et al. |
| 6,288,911 | B1 | | 9/2001 | Aoki et al. |
| 6,456,501 | B1 | | 9/2002 | Rubenstein et al. |
| 6,618,247 | B2 | | 9/2003 | Felcman et al. |
| 6,667,880 | B2 | | 12/2003 | Liu et al. |
| 6,906,915 | B2 | | 6/2005 | Tucker et al. |
| 7,102,885 | B2 | | 9/2006 | Chen et al. |
| 2006/0139868 | A1 | | 6/2006 | Hood et al. |
| 2006/0187631 | A1 | | 8/2006 | Muenzer et al. |

FOREIGN PATENT DOCUMENTS

| DE | 3624756 A1 | 1/1988 |
| DE | 20218651 U1 | 4/2003 |
| JP | 05102680 A | 4/1993 |
| JP | 09181468 A | 7/1997 |

OTHER PUBLICATIONS

Written Opinion and Search Report, Singapore Application No. 200601085-4, issued by the Australian Patent Office, May 29, 2006.

* cited by examiner

*Primary Examiner*—Lisa Lea-Edmonds
(74) *Attorney, Agent, or Firm*—Haynes and Boone, LLP

(57) ABSTRACT

According to one embodiment, a modular component securing apparatus includes a component chassis having a plurality of opposed walls, each wall including a support for receiving a modular component in one of a first orientation and a second orientation transverse to the first orientation. A component securing member is operable to be coupled to the component chassis adjacent selected ones of the opposed walls wherein the component securing member is operable to secure the modular component in the first orientation in response to being coupled to a first one of the walls, and is operable to secure the modular component in the second orientation in response to being coupled to a second one of the walls transverse to the first wall.

9 Claims, 12 Drawing Sheets

METHOD AND APPARATUS FOR SECURING A MODULAR COMPONENT IN A CHASSIS

CROSS REFERENCE TO RELATED APPLICATION

The present application is a Continuation of U.S application Ser. No. 11/065,725, filed Feb. 24, 2005, now U.S. Pat. No. 7,190,574, issued on Mar. 13, 2007, the disclosure of which is incorporated herein by reference.

BACKGROUND

The present disclosure relates generally to information handling systems, and more particularly to a method and apparatus for securing a modular component in a chassis.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include a chassis which may hold many of the modular components of the information handling system such as, for example, optical or floppy drives. A typical chassis may be positioned in either a horizontal or vertical orientation depending on the user's space availability. Whether the chassis is positioned in the horizontal or vertical configuration, it is desirable to provide horizontal access to the modular components for ease of use.

The modular components may be mounted to the chassis such that they are positioned to provide horizontal access either when the chassis is in the horizontal orientation or when the chassis is in the vertical orientation. The user must then choose a configuration which fits their space availability. However, the space availability of the user may change over the lifetime of the system, which can result in the relatively costly and time consuming process of reconfiguration of the modular components in the chassis.

Accordingly, it would be desirable to provide a method and apparatus for securing a modular component in a chassis absent the disadvantages found in the prior methods discussed above.

SUMMARY

According to one embodiment, a modular component securing apparatus includes a component chassis having a plurality of opposed walls, each wall including a support for receiving a modular component in one of a first orientation and a second orientation transverse to the first orientation. A component securing member is operable to be coupled to the component chassis adjacent selected ones of the opposed walls wherein the component securing member is operable to secure the modular component in the first orientation in response to being coupled to a first one of the walls, and is operable to secure the modular component in the second orientation in response to being coupled to a second one of the walls transverse to the first wall.

A principal advantage of this embodiment is that a modular component may be easily coupled and secured to the modular component chassis in a plurality of orientations.

BRIEF DESCRIPTION OF THE DRAWINGS

FIG. 4b is a perspective view illustrating an embodiment of the modular component of FIG. 4a.

FIG. 5b is a perspective view illustrating an embodiment of the modular component of FIG. 4a being positioned adjacent the modular component chassis of FIG. 2 during the method of FIG. 5a.

FIG. 5c is a perspective view illustrating an embodiment of the modular component of FIG. 4a being coupled to the modular component chassis of FIG. 2 in a first orientation during the method of FIG. 5a.

FIG. 5d is a perspective view illustrating an embodiment of the modular component of FIG. 4a being secured in the modular component chassis of FIG. 2 in a first orientation using the securing member of FIG. 3 during the method of FIG. 5a.

FIG. 5da is a perspective view illustrating an embodiment of a plurality of the modular components of FIG. 4a being secured in the modular component chassis of FIG. 2 in a first orientation using the securing member of FIG. 3 during the method of FIG. 5a.

FIG. 5e is a perspective view illustrating an embodiment of the modular component of FIG. 4a being coupled to the modular component chassis of FIG. 2 in a second orientation during the method of FIG. 5a.

FIG. 5f is a perspective view illustrating an embodiment of the modular component of FIG. 4a being secured in the modular component chassis of FIG. 2 in a second orientation using the securing member of FIG. 3 during the method of FIG. 5a.

FIG. 5fa is a perspective view illustrating an embodiment of a plurality of the modular components of FIG. 4a being secured in the modular component chassis of FIG. 2 in a second orientation using the securing member of FIG. 3 during the method of FIG. 5a.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Figure 1:
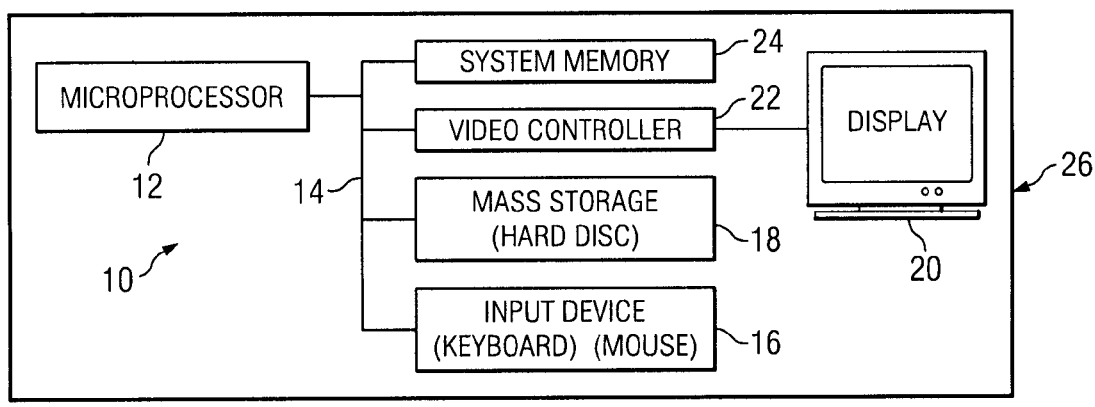
FIG. 1 is a schematic view illustrating an embodiment of an information handling system.

In one embodiment, information handling system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. In an embodiment, a chassis 26 houses some or all of the components of the information handling system 10. It should be understood that other busses and intermediate circuits can be deployed between the components described above and microprocessor 12 to facilitate interconnection between the components and the microprocessor.

Figure 2:
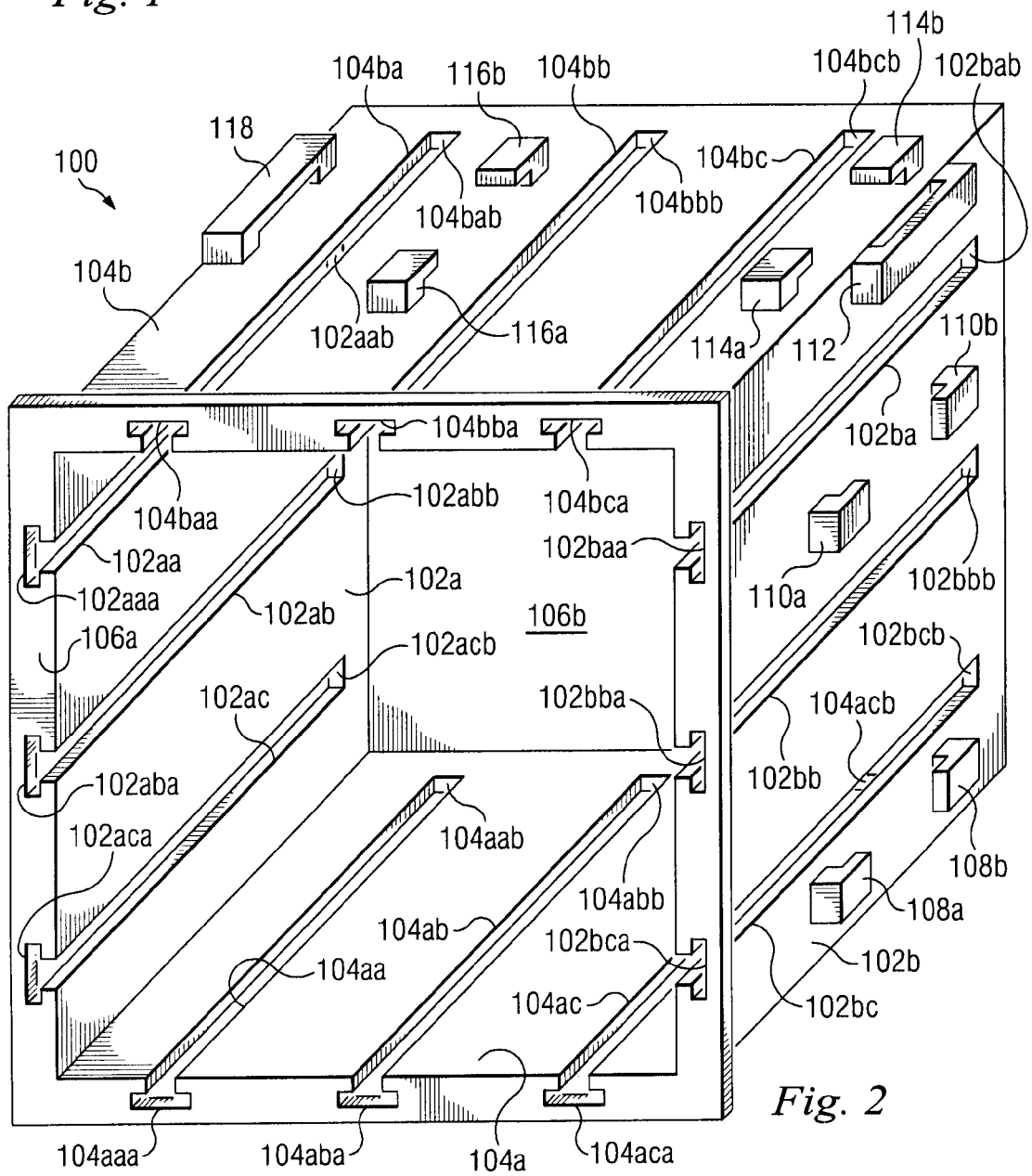
FIG. 2 is a perspective view illustrating an embodiment of a modular component chassis.

Referring now to FIG. 2, a modular component chassis 100 is illustrated. Modular component chassis 100 includes a first pair of substantially parallel walls 102a and 102b which are spaced apart and coupled together by a second pair of spaced apart substantially parallel walls 104a and 104b. Walls 102a, 102b, 104a, and 104b include front lip 106a running along an edge of each of the walls 102a, 102b, 104a, and 104b, and define a modular component compartment 106b positioned between them.

Wall 102a defines a plurality of channels 102aa, 102ab, and 102ac which are spaced apart and substantially parallel to each other. Each channel 102aa, 102ab, and 102ac extends through the wall 102a and from a respective entrance 102aaa, 102aba, and 102aca defined by the front lip 106a to a respective terminating end 102aab, 102abb, and 102acb in the wall 102a.

Wall 102b defines a plurality of channels 102ba, 102bb, and 102bc which are spaced apart and substantially parallel to each other. Each channel 102ba, 102bb, and 102bc extends through the wall 102b and from a respective entrance 102baa, 102bba, and 102bca defined by the front lip 106a to a respective terminating end 102bab, 102bbb, and 102bcb in the wall 102a. In an embodiment, the channels 102aa, 102ab, and 102ac on wall 102a and the channels 102ba, 102bb, and 102bc on wall 102b provide a first support structure. A pair of guides 108a and 108b extend from wall 102b and are positioned adjacent the channel 102bc. A pair of guides 110a and 110b extend from wall 102b and are positioned between the channels 102ba and 102bb. A guide stop 112 extends from wall 102b and is positioned adjacent channel 102ba and an edge of wall 102b. In an embodiment, the guides 108a, 108b, 110a, and 110b and the guide stop 112 provide a first securing member guide.

Wall 104a defines a plurality of channels 104aa, 104ab, and 104ac which are spaced apart and substantially parallel to each other. Each channel 104aa, 104ab, and 104ac extends through the wall 104a and from a respective entrance 104aaa, 104aba, and 104aca defined by the front lip 106a to a respective terminating end 104aab, 104abb, and 104acb in the wall 104a.

Wall 104b defines a plurality of channels 104ba, 104bb, and 104bc which are spaced apart and substantially parallel to each other. Each channel 104ba, 104bb, and 104bc extends through the wall 104b and from a respective entrance 104baa, 104bba, and 104bca defined by the front lip 106a to a respective terminating end 104bab, 104bbb, and 104bcb in the wall 104a. In an embodiment, the channels 104aa, 104ab, and 104ac on wall 104a and the channels 104ba, 104bb, and 104bc on wall 104b provide a second support structure. A pair of guides 114a and 114b extend from wall 104b and are positioned adjacent the channel 104bc. A pair of guides 116a and 116b extend from wall 104b and are positioned between the channels 104ba and 104bb. A guide stop 118 extends from wall 104b and is positioned adjacent channel 104ba and an edge of wall 104b. In an embodiment, the guides 114a, 114b, 116a, and 116b and the guide stop 118 provide a second securing member guide.

Figure 3:
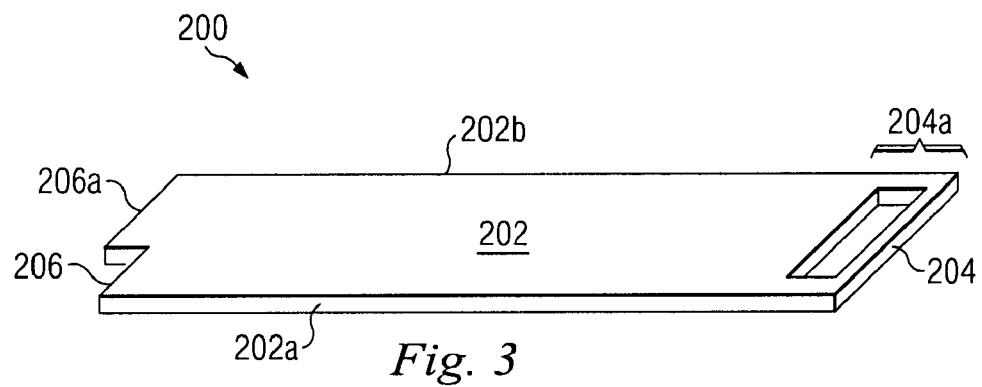
FIG. 3 is a perspective view illustrating an embodiment of a securing member used with the modular component chassis of FIG. 2.

Referring now to FIG. 3, a securing member 200 is illustrated. Securing member 200 includes an elongated base 202 having a side 202a and a side 202b opposite the side 202a. An end 204 on the securing member 200 includes a handle 204a. An end 206 is positioned opposite the end 204 and includes a stop portion 206a extending from the end 206.

Figure 4A:
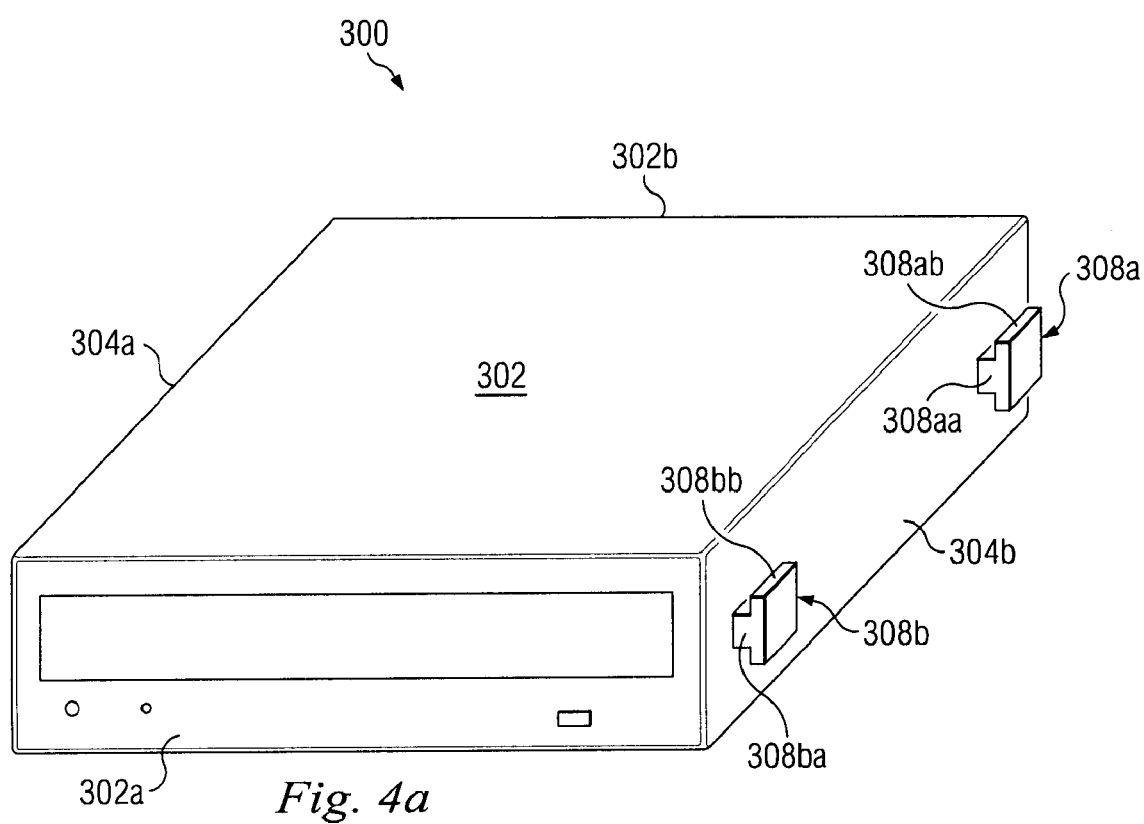
FIG. 4a is a perspective view illustrating an embodiment of a modular component used with the modular component chassis of FIG. 2 and the securing member of FIG. 3.
Figure 4B:
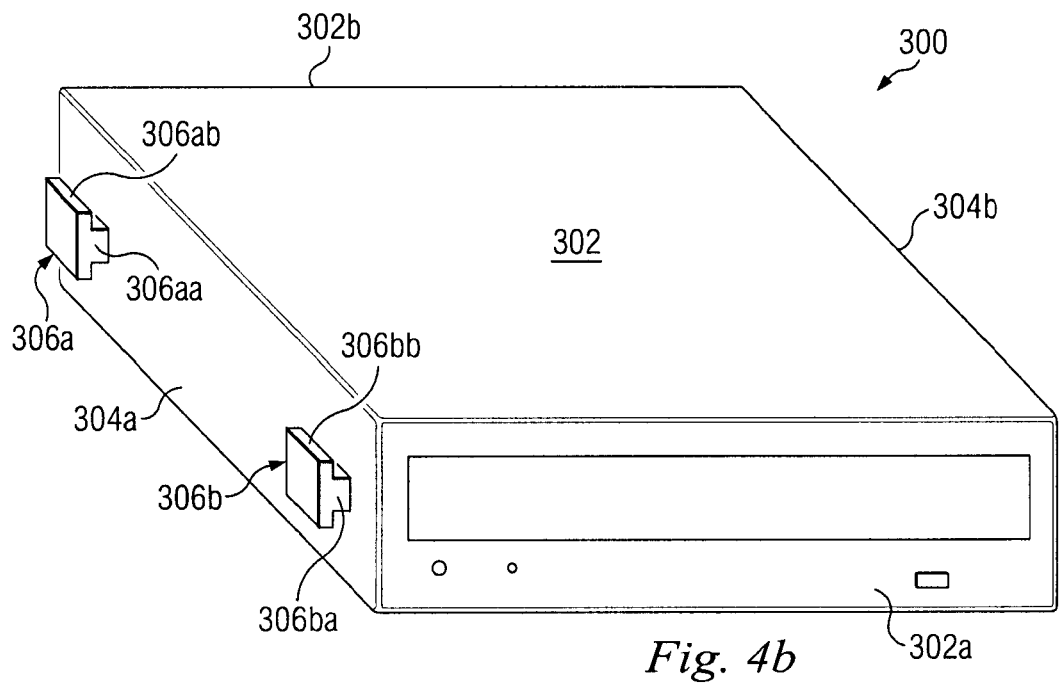

Referring now to FIGS. 4a and 4b, a modular component 300 is illustrated. Modular component 300 includes a base 302 having a front end 302a and a rear end 302b positioned opposite the front end 302a. A plurality of sides 304a and 304b are positioned spaced apart and extending between the front end 302a and the rear end 302b.

Side 304a includes a plurality of securing tabs 306a and 306b extending from it. Securing tabs 306a and 306b each include a beam 306aa and 306ba, respectively, extending from the side 304a with a head 306ab and 306bb, respectively, which has a greater width than the beams 306aa and 306ba and which are positioned on the distal end of the beams 306aa and 306ba. In an embodiment, securing tabs 306a and 306b may include, for example, conventional screws which are coupled to the modular component 300 in a manner which is known in the art.

Side 304b includes a plurality of securing tabs 308a and 308b extending from it. Securing tabs 308a and 308b each include a beam 308aa and 308ba, respectively, extending from the side 304b with a head 308ab and 308bb, respectively, which has a greater width than the beams 308aa and 308ba and which are positioned on the distal end of the beams 308aa and 308ba. In an embodiment, securing tabs 308a and 308b may include, for example, conventional screws which are coupled to the modular component 300 in a manner which is known in the art.

Referring now to FIGS. 2, 4b, 5a and 5b, a method 400 for securing a modular component in a chassis is illustrated. The method 400 begins at step 402 where the modular component 300 is positioned adjacent the first support structure. Modular component 300 is positioned in front of the modular component chassis 100 such that rear end 302b is adjacent the front lip 106a of modular component chassis 300. Securing tab 306a is lined up with entrance 102aaa on channel 102aa and securing tab 308a is lined up with entrance 102baa on channel 102ba.

Referring now to FIGS. 2, 4b, 5a, 5b and 5c, the method 400 proceeds to step 404 where modular component 300 is coupled to the first support structure. Modular component 300 is moved in a direction A, illustrated in FIG. 5b, such that securing tabs 306a and 308a enter the entrances 102aaa and 102baa, respectively. Once through entrance 102aaa, beam 306aa on securing tab 306a is positioned in the channel 102aa and head 306ab on securing tab 306a engages the wall 102a outside the channel 102aa and opposite the modular component compartment 106b. Once through entrance 102baa, beam 308aa on securing tab 308a is positioned in the channel 102ba and head 308ab on securing tab 308a engages the wall 102b outside the channel 102ba and opposite the modular component compartment 106b. Further movement of the modular component 300 in direction A results in the securing tabs 306b and 308b entering the entrances 102aaa and 102baa, respectively, and engaging the walls 102a and 102b, respectively, and the channels 102aa and 102ba, respectively, in the same manner as securing tabs 306a and 308a. Modular component 300 is coupled to the first support structure on modular component chassis 100 when securing tabs 306a and 308a engage the terminating ends 102aab and 102bab, respectively, on channels 102aa and 102ba, respectively. With the modular component 300 coupled to the first support structure on modular component chassis 100, the front end 302 of the modular component 300 is substantially flush with the front lip 106a.

Figure 5A:
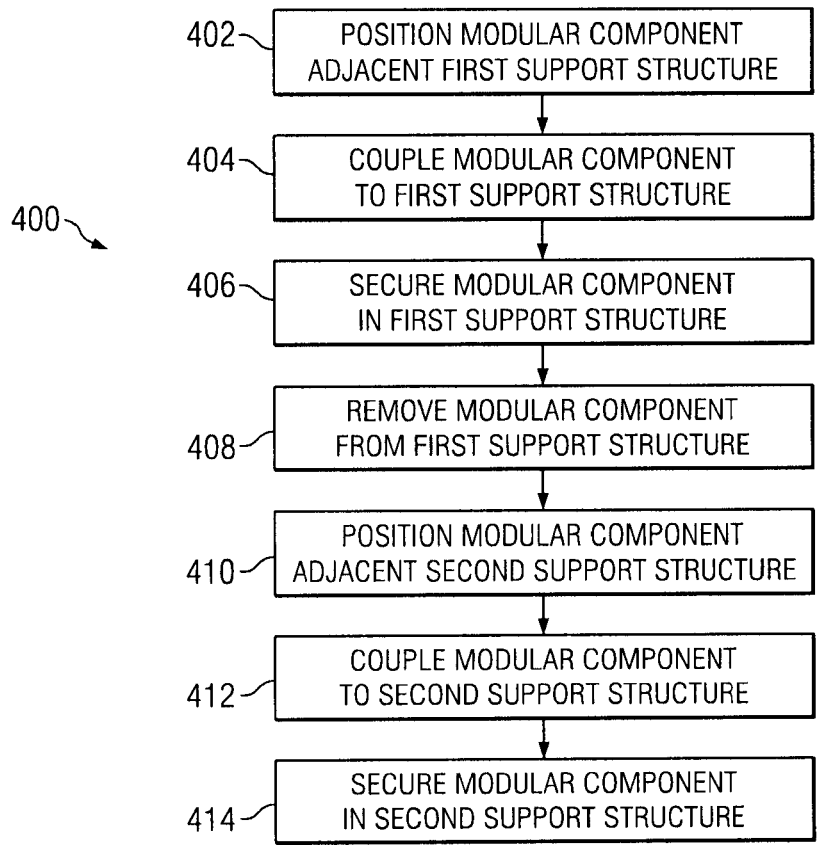
FIG. 5a is a flow chart illustrating an embodiment of a method for securing a modular component to a chassis.
Figure 5B:
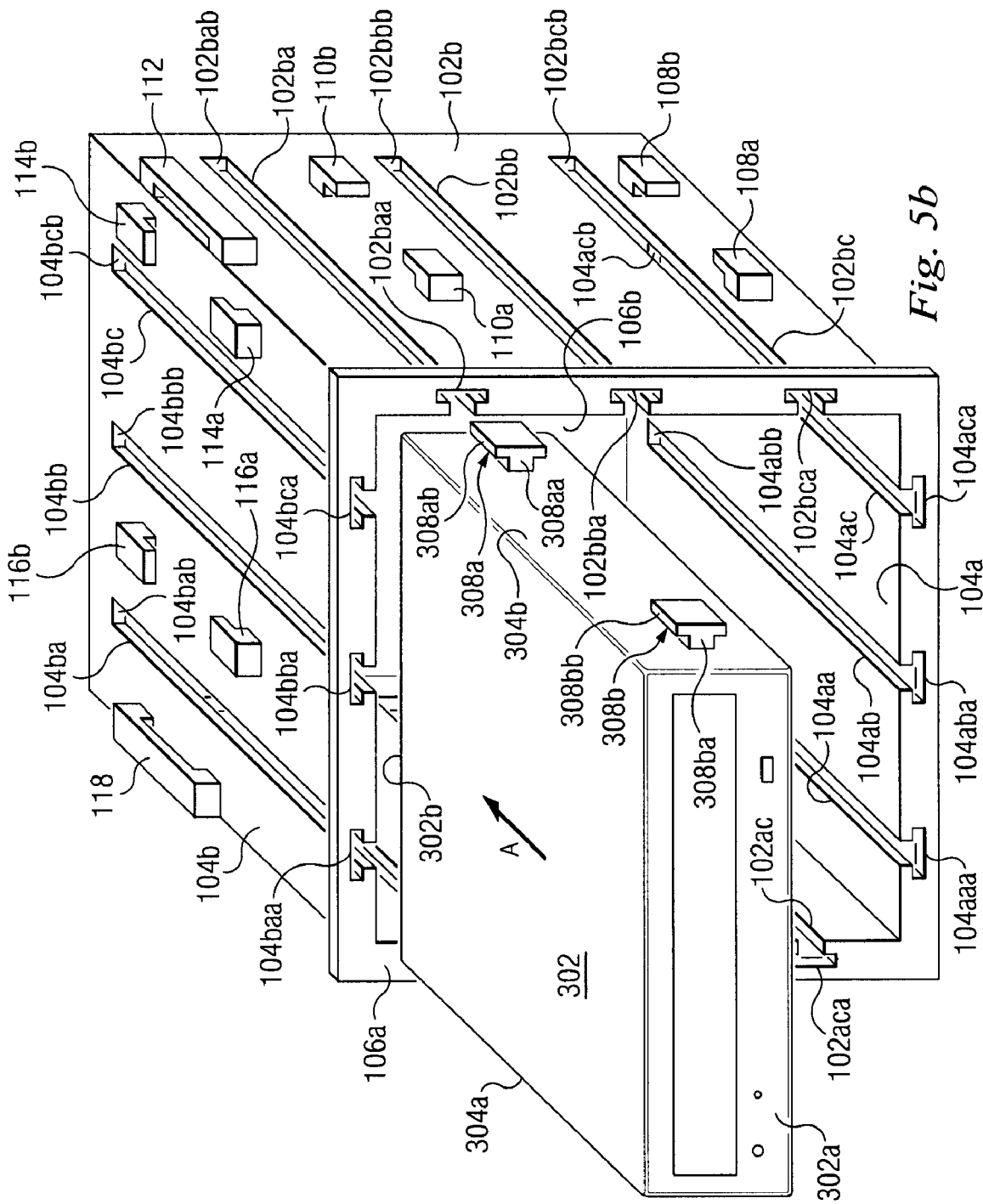
Figure 5C:
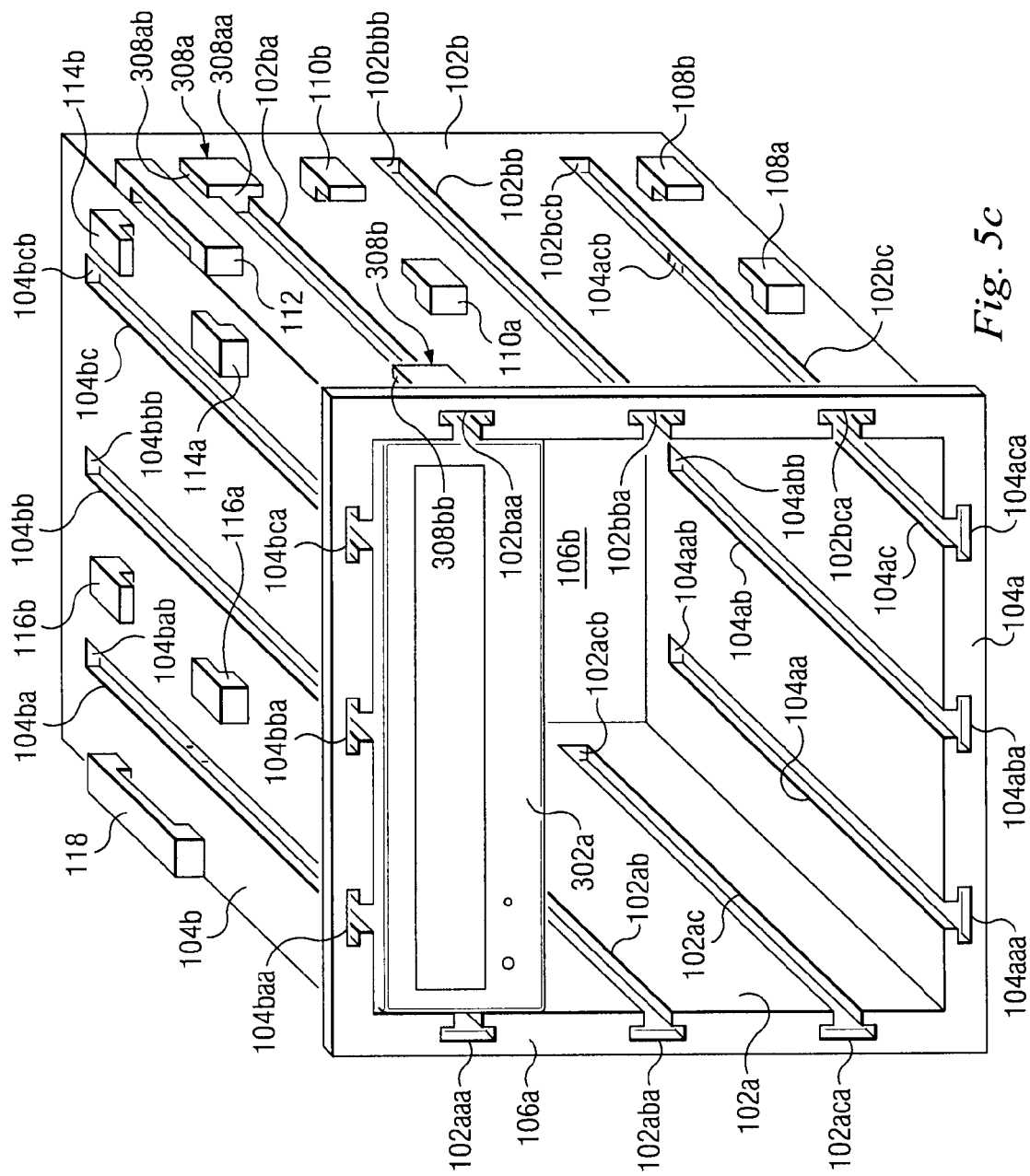
Figure 5D:
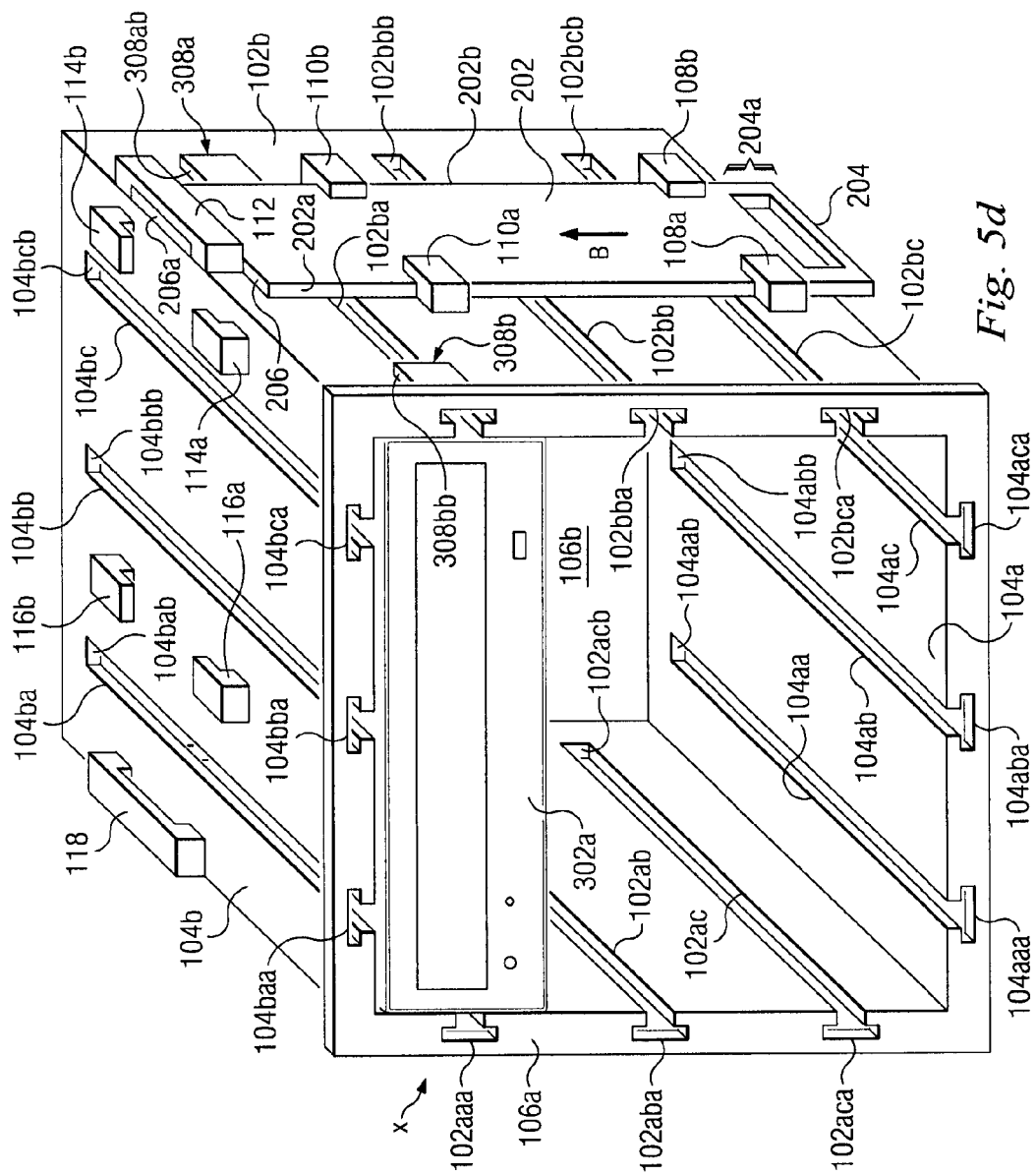
Figure 5D:
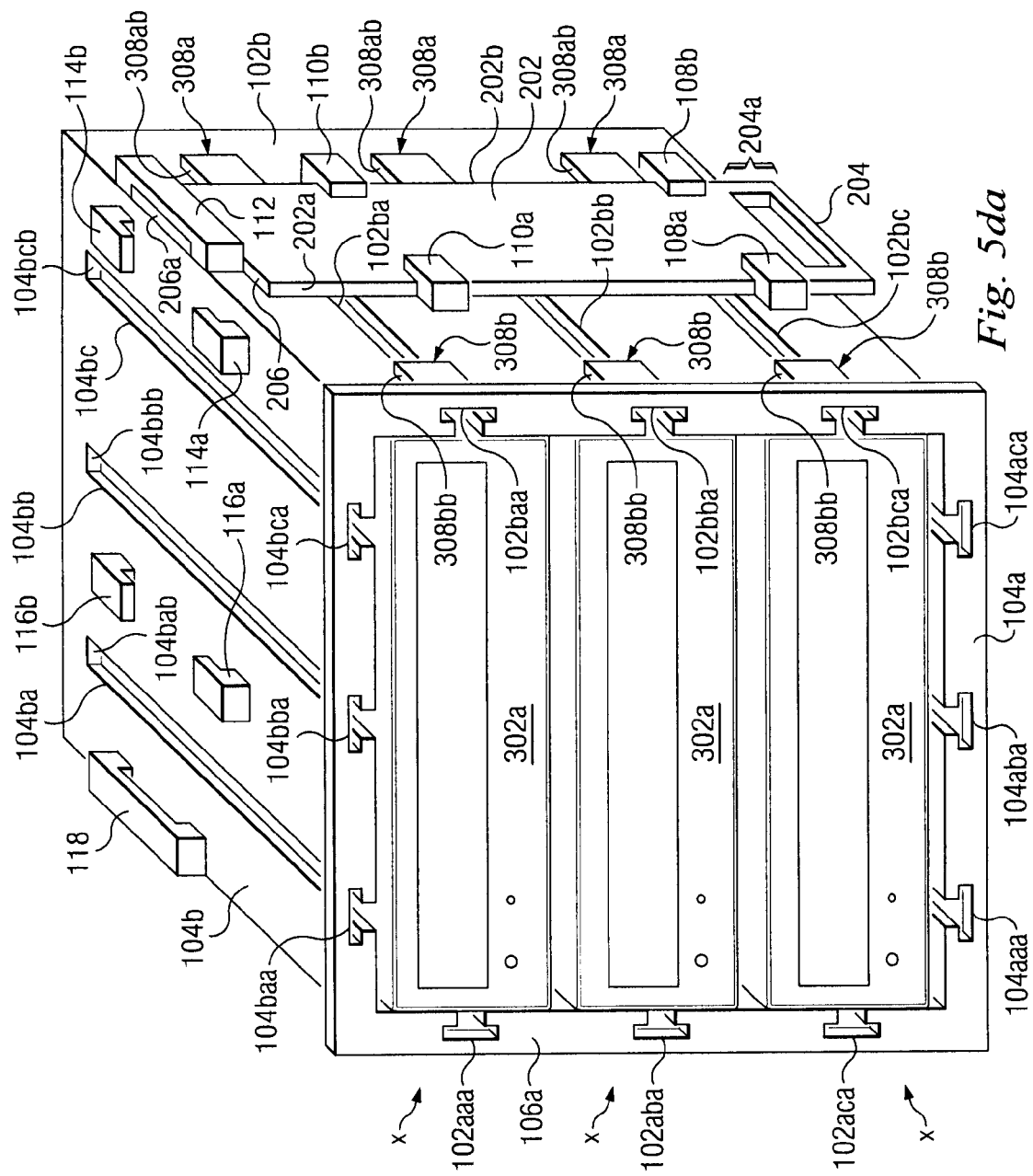

Referring now to FIGS. 5a and 5d, the method 400 proceeds to step 404 where the modular component 300 is secured in the first support structure. The securing member 200 is coupled to the modular component chassis 100 by positioning it in the first securing member guide. End 206 on securing member 200 is positioned adjacent guides 108a and 108b and securing member 200 is moved in a direction B such that sides 202a and 202b on securing member 200 are positioned between and engaged with the guides 108a and 108b. As securing member 200 continues to move in direction B, sides 202a and 202b become positioned between and engaged with guides 110a and 110b. Modular component 300 is secured in first support structure in an orientation X when stop portion 206a on end 206 engages guide stop 112 and side 202b on securing member 200 engages the head 308ab of securing tab 308a on modular component 300. Securing member 200 may then be held in position in the first securing member guide using convention means known in the art such as, for example, a snap that engages the handle 204a.

In an embodiment, illustrated in FIGS. 2 and 5da, a plurality of modular components 300 may be secured to the modular component chassis 100 with each in the orientation X. A modular component 300 may be coupled to the modular component chassis 100 in channels 102ab and 102bb and a modular component 300 may be coupled to the modular component chassis 100 in channels 102ac and 102bc using the method described above with reference to channels 102aa and 102ba. With the securing member 200 positioned and held in the guides 108a, 108b, 110a, 110b, and the guide stop 112 of first securing member guide, securing tabs 308a on the modular components 300 are held in place and each of the modular components 300 are secured in the modular component chassis 100 in the orientation X.

Referring now to FIGS. 4b, 5a, 5b, and 5d, the method 400 proceeds to step 408 where the modular component 300 is removed from the first support structure. Securing member 200 is removed from the first securing member guide by moving it in a direction opposite the direction B, illustrated in FIG. 5d, such that the side 202b of securing member 202 disengages the head 308ab of securing tab 308a on modular component 300. Modular component 300 may then be moved in a direction opposite the direction A, illustrated in FIG. 5b, such that securing tabs 306a and 306b are removed from channel 102aa, securing tabs 308a and 308b are removed from channel 102ba, and modular component 300 is removed from modular component compartment 106b.

Figure 5E:
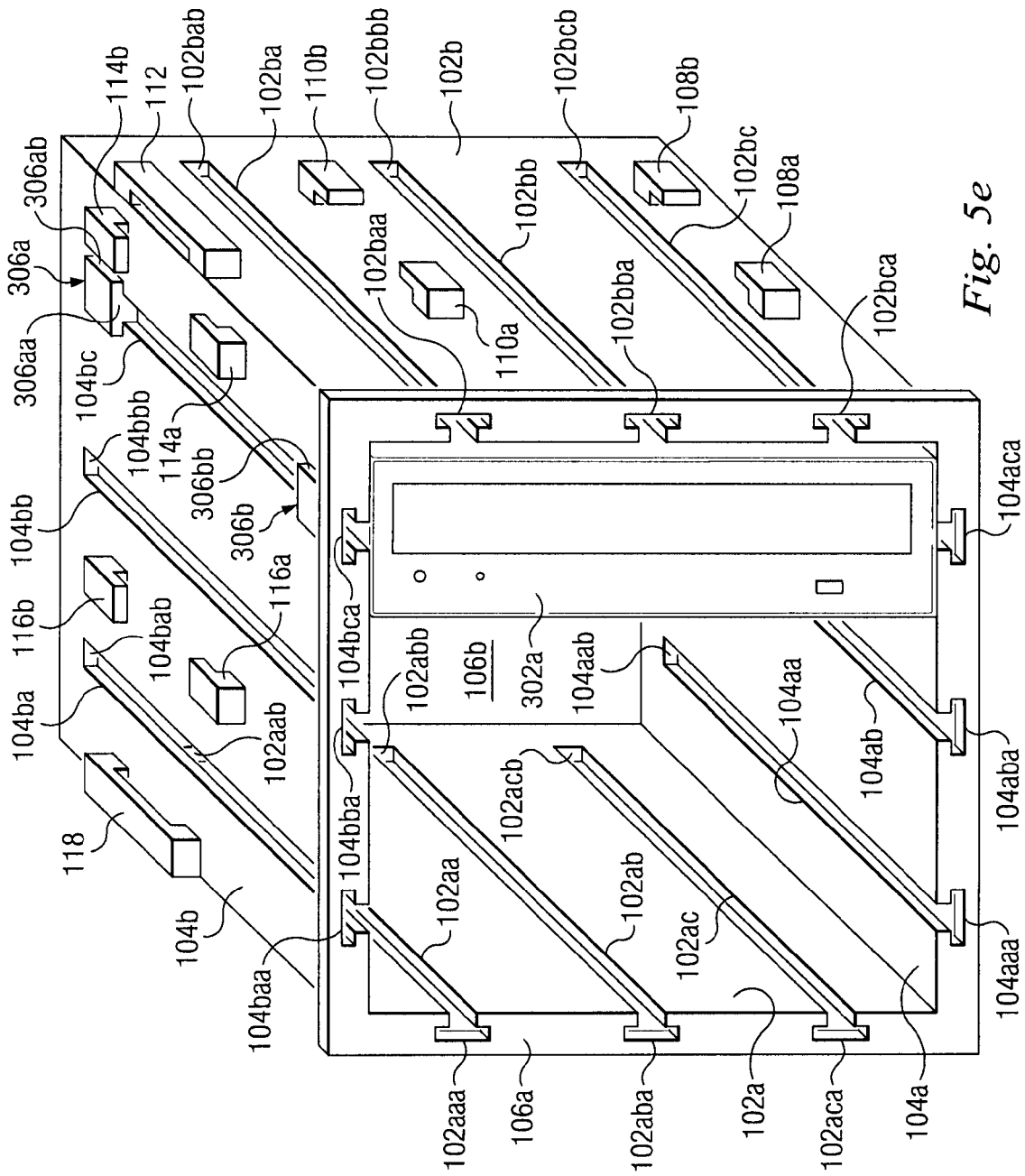

Referring now to FIGS. 4a, 5a, and 5e, the method 400 proceeds to step 410 where the modular component 300 is positioned adjacent the second support structure. Modular component 300 is positioned in front of the modular component chassis 100 such that rear end 302b is adjacent the front lip 106a of modular component chassis 300. Securing tab 308a is lined up with entrance 104aca on channel 104ac and securing tab 306a is lined up with entrance 104bca on channel 104bc. The method 400 then proceeds to step 412 where the modular component 300 is coupled to the second support structure. Modular component 300 is moved in a direction A, illustrated in FIG. 5b, such that securing tabs 308a and 306a enter the entrances 104aca and 104bca, respectively. Once through entrance 104aca, beam 308aa on securing tab 308a is positioned in the channel 104ac and head 308ab on securing tab 308a engages the wall 104a outside the channel 104ac and opposite the modular component compartment 106b. Once through entrance 104bca, beam 306aa on securing tab 306a is positioned in the channel 104bc and head 306ab on securing tab 306a engages the wall 104b outside the channel 104bc and opposite the modular component compartment 106b. Further movement of the modular component 300 in direction A results in the securing tabs 308b and 306b entering the entrances 104aca and 104bca, respectively, and engaging the walls 104a and 104b, respectively, and the channels 104ac and 104bc, respectively, in the same manner as securing tabs 308a and 306a. Modular component 300 is coupled to the second support structure on modular component chassis 100 when securing tabs 308a and 306a engage the terminating ends 104acb and 104bcb, respectively, on channels 104ac and 104bc, respectively. With the modular component 300 coupled to the second support structure on modular component chassis 100, the front end 302 of the modular component 300 is substantially flush with the front lip 106a.

Figure 5F:
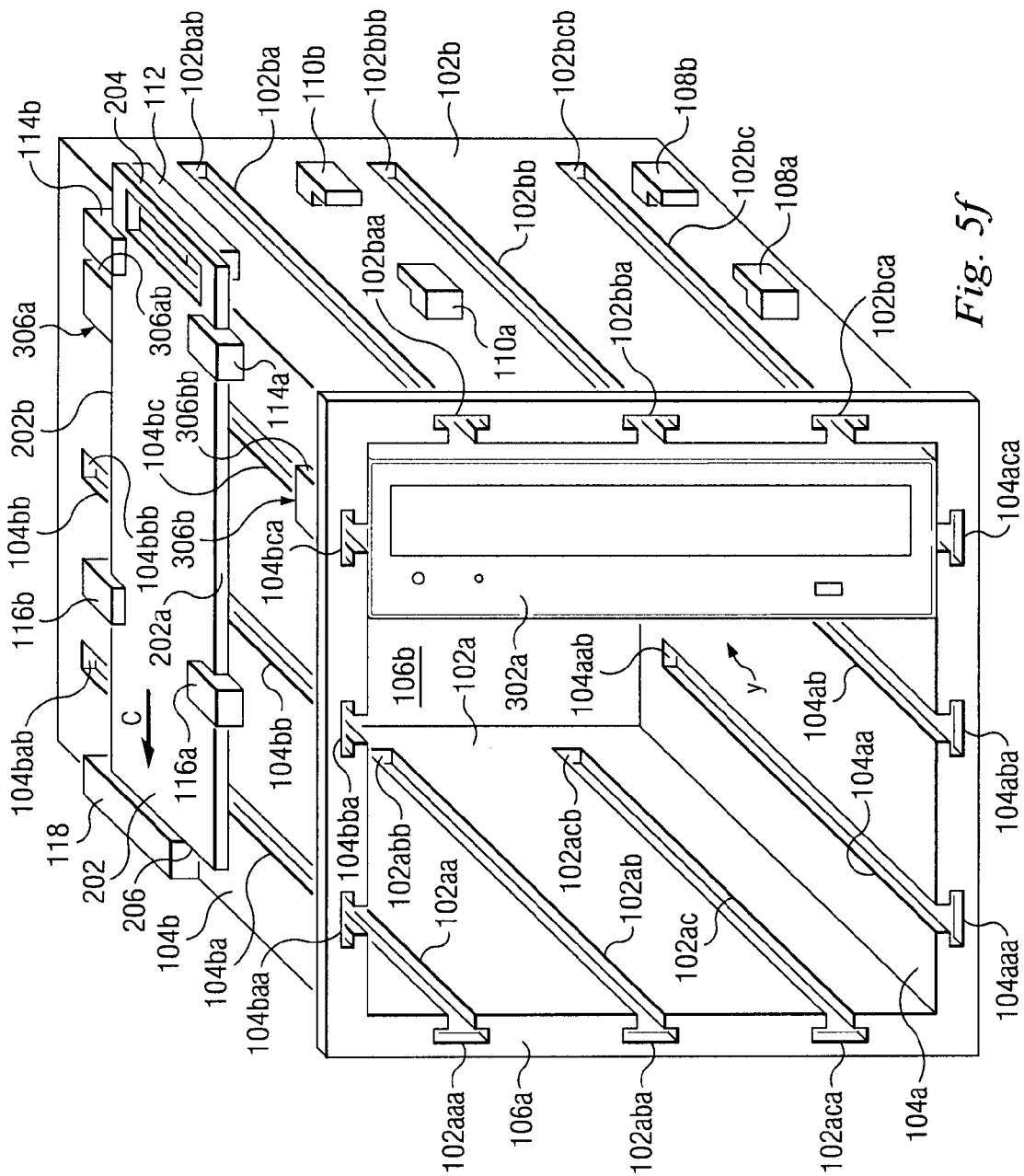
Figure 5F:
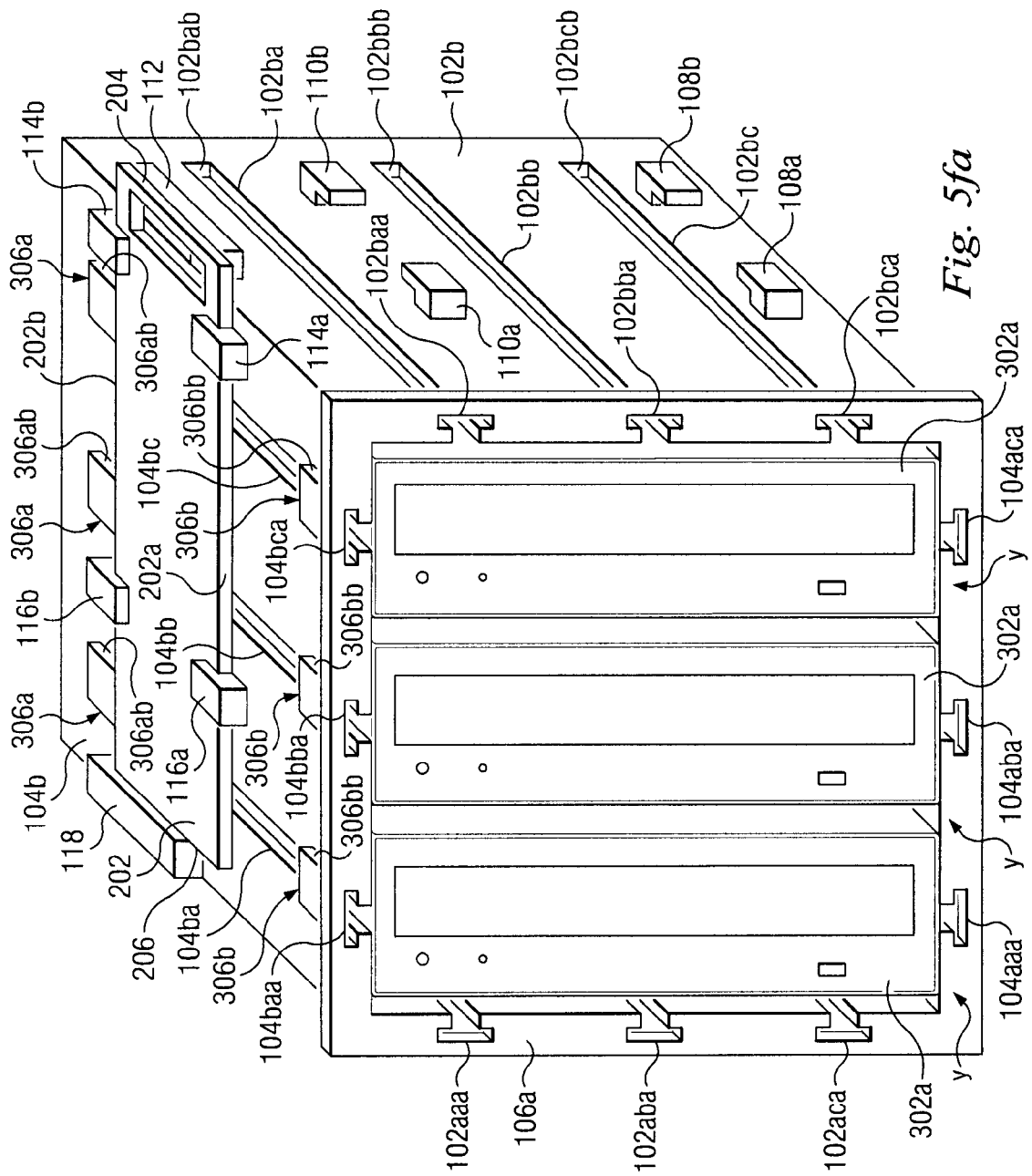

Referring now to FIGS. 3, 5a, and 5f, the method 400 proceeds to step 414 where the modular component 300 is secured in the second support structure. The securing member 200 is coupled to the modular component chassis 100 by positioning it in the second securing member guide. End 206 on securing member 200 is positioned adjacent guides 114a and 114b and securing member 200 is moved in a direction C such that sides 202a and 202b are positioned between and engaged with the guides 114a and 114b. As securing member 200 continues to move in direction C, sides 202a and 202b become positioned between and engaged with guides 116a and 116b. Modular component 300 is secured in first support structure in an orientation Y when stop portion 206a on end 206 engages guide stop 118 and side 202b on securing member 200 engages the head 308ab of securing tab 308a on modular component 300. Securing member 200 may then be held in position in the second securing member guide using convention means known in the art such as, for example, a snap that engages the handle 204a.

In an embodiment, illustrated in FIGS. 2 and 5fa, a plurality of modular components 300 may be secured to the modular component chassis 100 with each in the orientation Y. A modular component 300 may be coupled to the modular component chassis 100 in channels 104ab and 104bb and a modular component 300 may be coupled to the modular component chassis 100 in channels 104aa and 104ba using the method described above with reference to channels 104ac and 104bc. With the securing member 200 positioned and held in the guides 114a, 114b, 116a, 116b, and the guide stop 118 of second securing member guide, securing tabs 308a on the modular components 300 are held in place and each of the modular components 300 are secured in the modular component chassis 100 in the orientation Y.

Figure 6A:
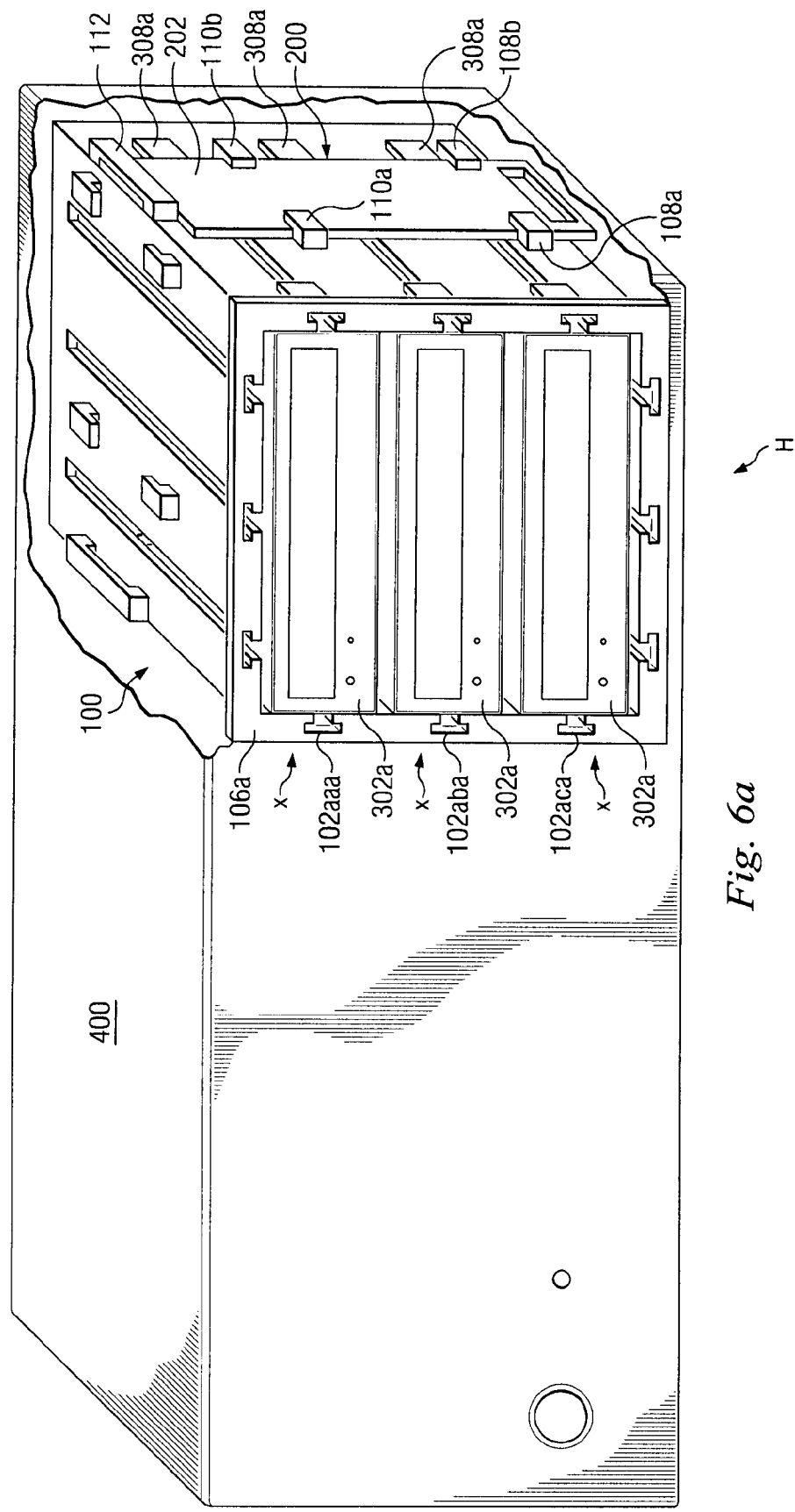
FIG. 6a is a perspective view illustrating an embodiment of an information handling system in a horizontal orientation with the modular component chassis of FIG. 2 mounted in an it and a plurality of the modular components of FIG. 4a being secured in the modular component chassis in a first orientation.
Figure 6B:
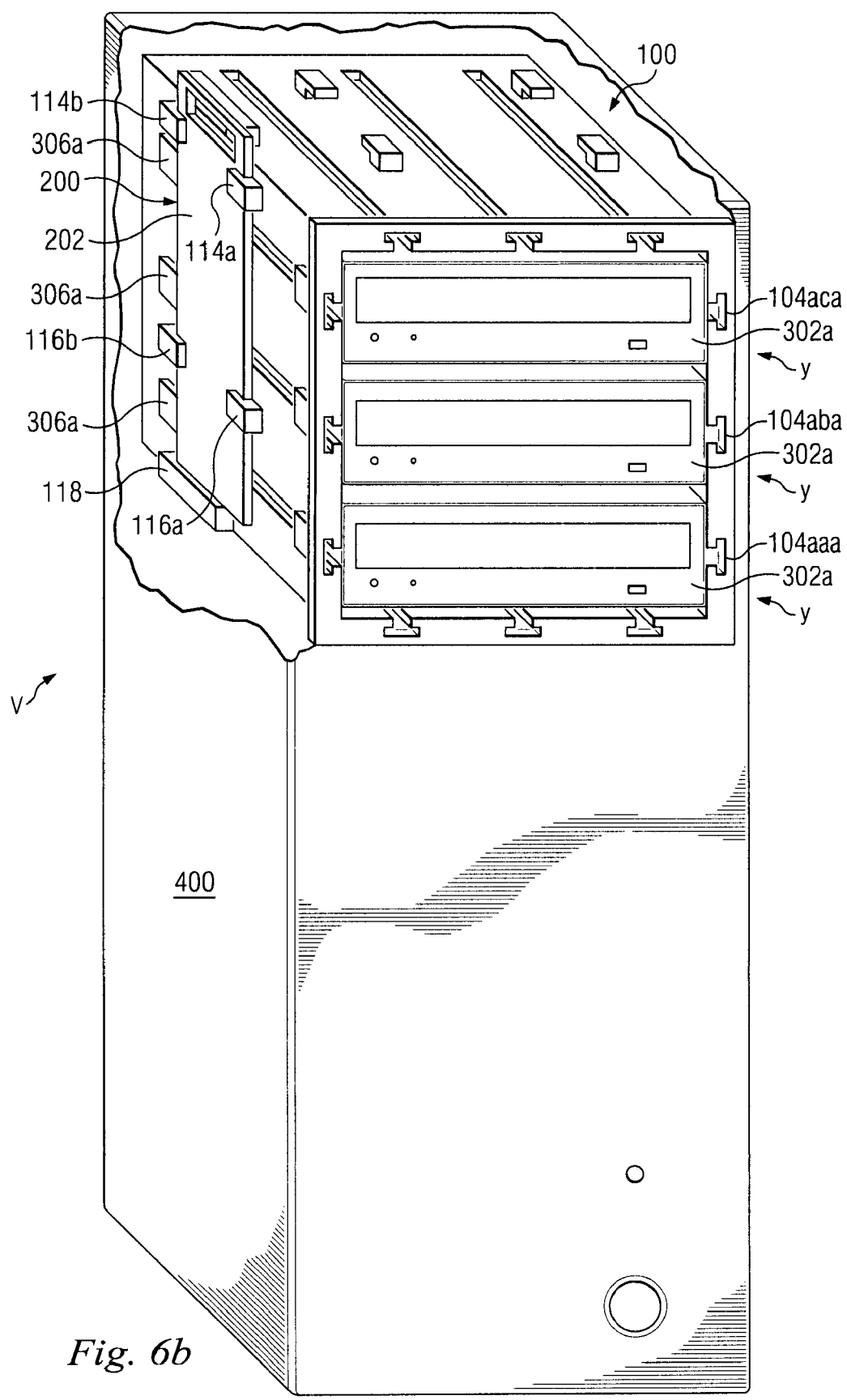
FIG. 6b is a perspective view illustrating an embodiment of the information handling system chassis of FIG. 6a in a vertical orientation with a plurality of the modular components of FIG. 4a being secured in the modular component chassis in a second orientation.

Referring now to FIGS. 6a and 6b, in an alternative embodiment, the modular component chassis 300 is mounted in an information handling system chassis 400 which may be, for example, the chassis 26 which houses information handling system 10, illustrated in FIG. 1. The information handling system chassis 400 may be placed in a horizontal orientation H and, following the steps 402, 404, and 406 of method 400, described above with reference to FIGS. 5a, 5b, 5c, 5d, and 5da, a plurality of modular components 300 may be secured in the modular component chassis 300 and the information handling system chassis 400 in the orientation X. In an embodiment, the orientation X is substantially transverse to the horizontal orientation H. Thus, a method and apparatus are provided which allow horizontal access to the modular components 300 when the information handling system chassis 400 is positioned in the horizontal orientation H. The information handling system chassis 400 may then be repositioned in a vertical orientation V, which is substantially transverse to the horizontal orientation H, and, following the steps 408, 410, 412, and 414 of the method 400, described above with reference to FIGS. 5a, 5e, 5f, and 5fa, a plurality of modular components 300 may be secured in the modular component chassis 300 and the information handling system chassis 400 in the orientation Y. In an embodiment, the orientation Y is substantially transverse to the vertical orientation V. Thus, a method and apparatus are provided which allow horizontal access to the modular components 300 when the information handling system chassis 400 is positioned in the vertical orientation V.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A modular component securing apparatus comprising:
   a component chassis including a first pair of opposed walls, each wall including a respective support for receiving a modular component having tabs, and a second pair of opposed walls in one of a first orientation and a second orientation transverse to the first orientation; and
   a single removable component securing member operable to be coupled to the component chassis adjacent a selected one of the opposed walls, operable to secure the modular component in the first orientation when the securing member is coupled to one of the first pair of walls and engages one of the tabs, and operable to secure the modular component in the second orientation when the securing member is coupled to one of the second pair of walls and engages one of the tabs.

2. The apparatus as defined in claim 1 wherein the support includes a plurality of channels and the modular component includes tabs slidably received by the channels.

3. The apparatus as defined in claim 2 wherein the chassis includes a plurality of guides and a stop for slidably receiving and retaining the component securing member.

4. An information handling system comprising:
   an information handling system chassis operable to be positioned in a horizontal orientation and a vertical orientation;
   a component chassis including a first pair of opposed walls and a second pair of opposed walls, each wall including a respective support for receiving a modular component having tabs, in one of the horizontal orientation and the vertical orientation transverse to the horizontal orientation; and
   a single removable component securing member operable to be coupled to the component chassis adjacent a selected one of the opposed walls, operable to secure the modular component in the horizontal orientation when the securing member is coupled to one of the first pair of walls and engages one of the tabs, and operable to secure the modular component in the vertical orientation when the securing member is coupled to one of the second pair of walls and engages one of the tabs.

5. The system as defined in claim 4 wherein the support includes a plurality of channels and the modular component includes tabs slidably received by the channels.

6. The system as defined in claim 5 wherein the chassis includes a plurality of guides and a stop for slidably receiving and retaining the component securing member.

7. A method for securing a modular component to a chassis, comprising:
   providing an information handling system (IHS) chassis including a component chassis mounted in the IHS chassis;
   providing a component chassis including a first pair of opposed walls and a second pair of opposed walls, each wall including a respective support for receiving a modular component having tabs, in one of a first orientation and a second orientation transverse to the first orientation; and
   coupling a single removable component securing member to the component chassis adjacent a selected one of the opposed walls, the securing member being operable to secure the modular component in the first orientation when the securing member is coupled to one of the first pair of walls and engages one of the tabs, and operable to secure the modular component in the second orientation when the securing member is coupled to one of the second pair of walls and engages one of the tabs.

8. The method as defined in claim 7 wherein the support includes a plurality of channels and the modular component includes tabs slidably received by the channels.

9. The method as defined in claim 8 wherein the chassis includes a plurality of guides and a stop for slidably receiving and retaining the component securing member.

* * * * *